UNITED STATES PATENT OFFICE.

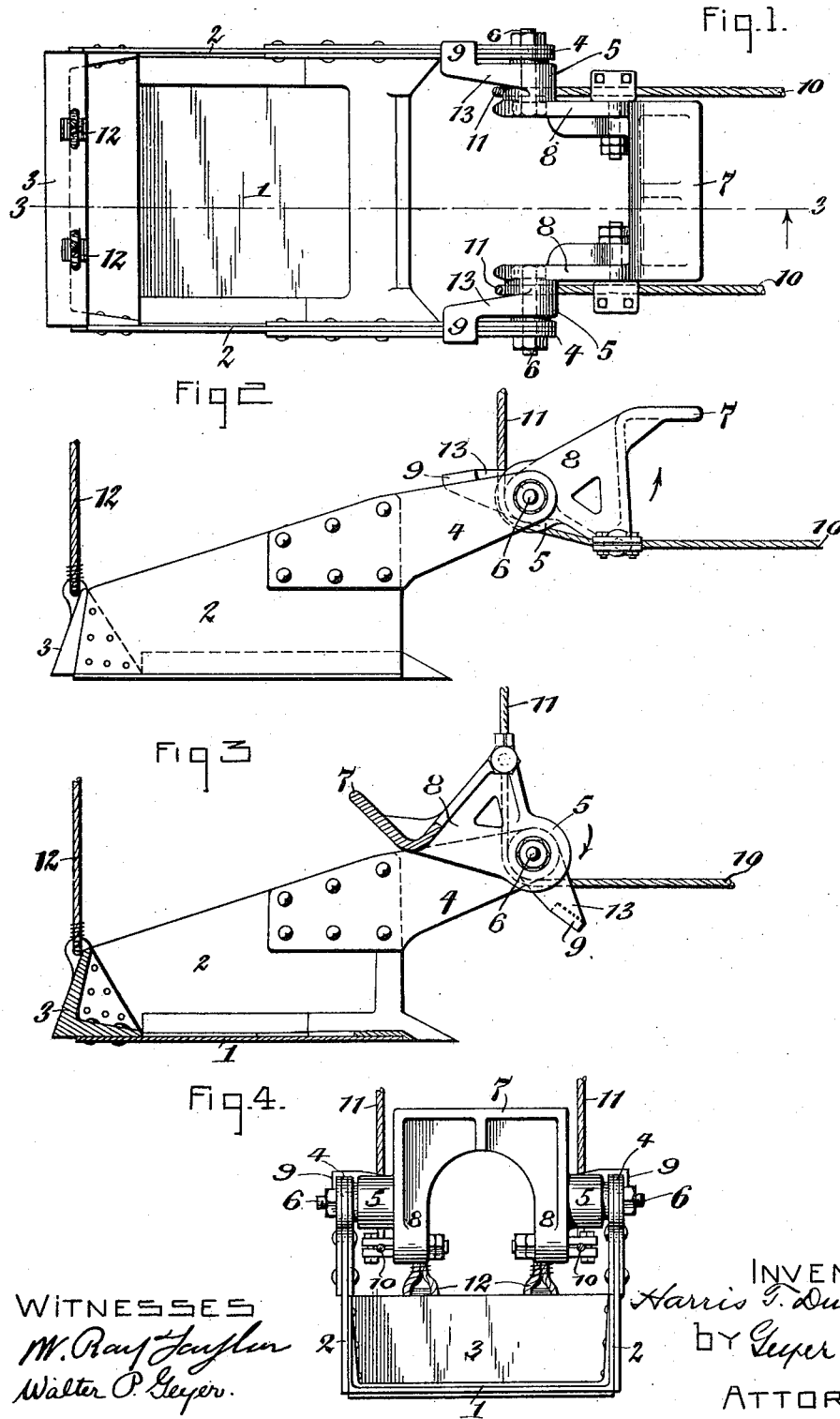

HARRIS T. DUNBAR, OF BUFFALO, NEW YORK.

DRAG-LINE BUCKET.

1,132,917.  Specification of Letters Patent.  Patented Mar. 23, 1915.

Application filed October 25, 1913. Serial No. 797,298.

*To all whom it may concern:*

Be it known that I, HARRIS T. DUNBAR, a citizen of the United States, residing at Buffalo, in the county of Erie and State of New York, have invented new and useful Improvements in Drag-Line Buckets, of which the following is a specification.

This invention has for its object the provision of a drag line bucket having simple, efficient and inexpensive means whereby any large rocks or similar lumps of material lying upon the ground in front of the mouth of the scoop or projecting partly into the same may be pushed rearwardly into the scoop to a sufficient extent so as to be carried away with the latter, and thereby increase the working capacity of the bucket.

In the accompanying drawings: Figure 1 is a top plan view of a drag line bucket embodying the preferred form of my improvements. Fig. 2 is a side elevation thereof showing the loading yoke in the position which it occupies while the scoop is being dragged forwardly over the material from which a load is to be gathered into the scoop. Fig. 3 is a vertical longitudinal section of the same taken in line 3—3, Fig. 1 but showing the loading yoke in the position which it occupies after the lifting line has effected the initial part of its upward movement. Fig. 4 is a front elevation of my improved bucket showing the parts in the position corresponding to Figs. 1 and 2.

Similar characters of reference indicate corresponding parts throughout the several views.

The scoop which is shown in the drawings for illustrating my invention comprises a horizontal bottom 1, two longitudinal side walls 2, 2 rising from opposite longitudinal edges of the bottom and a rear wall 3 connecting the rear edges of the bottom and side walls so as to produce a receptacle which is open at the top and also at the front end and forms a mouth for the scoop at the last mentioned end thereof. Each of the side walls is provided with a forwardly projecting horn or arm 4 on the upper part thereof which practically forms a forward extension of this wall. Upon these two horns is mounted for vertical rotation a loading yoke whereby during the initial part of the upward pull of the lifting line additional material may be loaded into the scoop. In its preferred form this yoke comprises two hubs 5, 5 which are arranged axially in line transversely of the scoop and each of which is pivoted by a horizontal transverse bolt 6 to the inner side of a front end of one of the horns, and two supporting arms 8, 8 projecting laterally forward from the hubs and having their outer ends connected by a horizontal transverse push bar 7. The yoke is provided with a stop device which is adapted to limit the forward rotation of the same, this stop device consisting preferably of two arms 13 projecting radially from the hubs and fingers 9 projecting laterally from the outer ends of the arms, respectively, in position to engage with the upper side of the adjacent horns.

10, 10 represent the two branches or sections of a drag or pull line which are connected with the underside of the supporting arms of the yoke.

11, 11 represent the two sections or parts of a hoisting or lifting line each of which is connected at its lower end with the underside of one of the supporting arms and passes with its intermediate part around the lower and rear sides of the adjacent hub.

12 represents the two sections or parts of a dumping line which are connected with the rear part of the scoop.

Upon pulling forwardly on the drag or pull line while the scoop is resting upon the material to be transported the loading yoke is turned forwardly in the direction of the arrow in Fig. 2 until the stop fingers of its stop arms while arranged on the rear side of the axis of the yoke engage with the upper sides of the horns and arrest the further movement of the yoke in this direction, thereby arresting the forward rotation of the push bar 7 when the same is arranged at a considerable distance above and in front of the mouth of the scoop, thereby permitting the material to freely enter the mouth of the scoop as the latter is dragged over the same. After as much material has been gathered into the scoop as is possible by dragging the same over the material, the drag or pull line is slackened and an upward pull is exerted on the lifting or hoisting line. This causes the yoke to be turned backwardly in the direction of the arrow shown in Fig. 3 so that the push bar 7 swings from a position in front of the axis of the yoke downwardly and rearwardly to a position in rear of the axis of the yoke and comes to rest at a point adjacent to the upper part of the mouth of the yoke and substantially vertically in line with the front edge of the bottom. By this means this push bar moves rearwardly through the mouth of the scoop and engages any large rocks or large lumps of other material lying on the ground in front of the mouth of the scoop or projecting partly into the same and pushes the same a sufficient distance rearwardly into the scoop so as to be carried away by the latter to the place of deposit during the further upward and lateral movement of the lifting line which is imparted to the same by the hoisting mechanism associated with the bucket. A much larger load may therefore be gathered into the scoop by this means than is possible by simply dragging the scoop over the loose material to be transported, thereby increasing the capacity of the hoisting apparatus and reducing the cost of doing this work accordingly. When it is desired to dump the load it is only necessary to elevate the rear end of the scoop relatively to the front end thereof which can be accomplished either by holding the lifting line at rest and raising the dumping line or holding the dumping line at rest and lowering the lifting line.

By supporting the push bar 7 from the hubs of the yoke by means of two arms which project upwardly therefrom in the loading position of the bucket an unobstructed space of considerable area is provided in front of the scoop which enables large rocks and like material to be admitted to the scoop so that a maximum load for the latter is always insured and the working efficiency of the same is increased accordingly. In the rearmost position of the push bar the same fully clears the mouth of the scoop so that the same does not interfere with the free discharge of material from the scoop.

I claim as my invention:

1. A drag line bucket comprising a scoop, a loading yoke pivoted on said scoop and having a push member which swings through the mouth of the scoop and means for operating said yoke so as to retain said push member in front of the front end of said scoop during the loading operation.

2. A drag line bucket comprising a scoop, a loading yoke pivoted on said scoop and having a push member which swings through the mouth of the scoop, a drag line connected with said yoke and operating to swing the yoke forwardly so as to retain the push member in front of the front end of the scoop during the loading operation, a lifting line connected with said yoke and operating to swing said yoke rearwardly and a dumping line connected with the rear part of said scoop.

3. A drag line bucket comprising a scoop, a loading yoke pivoted on said scoop and having a push member which swings through the mouth of the scoop and having a stop which engages said scoop to limit the forward swinging movement of the yoke relatively to the scoop and means for operating said yoke so as to retain said push member in front of the front end of said scoop during the loading operation.

4. A drag line bucket comprising a scoop provided at its front end with a mouth and on its side walls with forwardly projecting horns, and a vertically swinging loading yoke having hubs pivotally mounted on the inner sides of said horns, a push bar arranged on one side of said hubs and adapted to move lengthwise through the mouth of the scoop, and stops arranged on the opposite sides of said hubs and adapted to engage the adjacent parts of the side walls of the scoop for limiting the forward turning movement of the yoke.

5. A drag line bucket comprising a scoop provided at its front end with a mouth and on its side walls with forwardly projecting horns, a vertically swinging loading yoke having hubs pivotally mounted on the inner sides of said horns, a push bar arranged on one side of said hubs and adapted to move lengthwise through the mouth of the scoop, and stops arranged on the opposite sides of said hubs and adapted to engage the adjacent parts of the side walls of the scoop for limiting the forward turning movement of the yoke, a drag line connected with said yoke and adapted to turn the same forward, a lifting line connected with the yoke and passing around the hubs thereof, and a dumping line connected with the rear part of the scoop.

Witness my hand this 21st day of October, 1913.

HARRIS T. DUNBAR.

Witnesses:
THEO. L. POPP,
ANNA HEIGIS.

Copies of this patent may be obtained for five cents each, by addressing the "Commissioner of Patents, Washington, D. C."